US008346678B1

(12) United States Patent
Markarian et al.

(10) Patent No.: US 8,346,678 B1
(45) Date of Patent: *Jan. 1, 2013

(54) METHOD AND SYSTEM FOR CONDUCTING COMMERCE OVER A WIRELESS COMMUNICATION NETWORK

(75) Inventors: Grigor Markarian, Agoura, CA (US); Ramadurai Vaidyanathan, Thousand Oaks, CA (US); Arun Ahuja, Thousand Oaks, CA (US); Albert Cohen, Encino, CA (US); Anand Tata, Moorpark, CA (US)

(73) Assignee: Citicorp Development Center, Inc., Blue Ash, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/913,941

(22) Filed: Oct. 28, 2010

Related U.S. Application Data

(63) Continuation of application No. 10/028,718, filed on Dec. 28, 2001.

(60) Provisional application No. 60/258,495, filed on Dec. 29, 2000.

(51) Int. Cl.
*G06Q 30/00* (2012.01)
*G06Q 40/00* (2012.01)
*G05B 19/00* (2006.01)

(52) U.S. Cl. ........... 705/346; 705/26.1; 705/40; 705/39; 340/5.41; 340/5.5

(58) Field of Classification Search ................... 705/1.1, 705/16–18, 21, 26.1–30, 34, 35, 37, 39–44, 705/346, 64–69; 340/5.41, 5.4, 5.64; 709/218, 709/219, 249
See application file for complete search history.

(56) References Cited

U.S. PATENT DOCUMENTS

| 4,554,418 | A | 11/1985 | Toy |
| 5,220,501 | A | 6/1993 | Lawlor et al. |
| 5,221,838 | A | 6/1993 | Gutman et al. |
| 5,465,206 | A | 11/1995 | Hilt et al. |
| 5,530,438 | A | 6/1996 | Bickham et al. |
| 5,640,002 | A | 6/1997 | Ruppert et al. |
| 5,689,565 | A | 11/1997 | Spies et al. |

(Continued)

FOREIGN PATENT DOCUMENTS

EP 0745961 12/1996

(Continued)

OTHER PUBLICATIONS

Amato-McCoy, Web Bank Plans to Enable TV Access, Bank Systems & Technology, 1998, p. 25, vol. 35, No. 1, Gralla Publications, 2 pages.

(Continued)

*Primary Examiner* — Igor Borissov
(74) *Attorney, Agent, or Firm* — Eric L. Sophir; SNR Denton US LLP

(57) ABSTRACT

Described herein is an enabling product that facilitates implementation of an m-commerce business solution. According to an embodiment of the present invention an m-commerce solution includes: a content provider or merchant site that provides products and goods to be purchased; a payment system allowing online authorization of funds to purchase the goods; and a wireless network for all customer interactions. Embodiments described herein perform at least one of the following three functions: 1) protocol conversions; 2) customer information reposing, and 3) payment authorization system interfacing.

12 Claims, 13 Drawing Sheets

U.S. PATENT DOCUMENTS

| | | | |
|---|---|---|---|
| 5,706,211 A | 1/1998 | Beletic et al. | 364/514 R |
| 5,708,422 A | 1/1998 | Blonder et al. | |
| 5,715,020 A | 2/1998 | Kuroiwa et al. | |
| 5,744,787 A | 4/1998 | Teicher | |
| 5,745,689 A | 4/1998 | Yaeger et al. | 395/200.36 |
| 5,748,737 A | 5/1998 | Daggar | |
| 5,748,884 A | 5/1998 | Royce et al. | |
| 5,754,111 A | 5/1998 | Garcia | |
| 5,790,677 A | 8/1998 | Fox et al. | |
| 5,790,790 A | 8/1998 | Smith et al. | 395/200.36 |
| 5,796,832 A | 8/1998 | Kawan | |
| 5,839,052 A | 11/1998 | Dean et al. | |
| 5,875,302 A | 2/1999 | Obhan | 395/200.55 |
| 5,878,141 A | 3/1999 | Daly et al. | |
| 5,878,337 A | 3/1999 | Joao et al. | |
| 5,903,652 A | 5/1999 | Mital | |
| 5,907,547 A | 5/1999 | Foladare et al. | 370/352 |
| 5,920,847 A | 7/1999 | Kolling et al. | |
| 5,944,786 A | 8/1999 | Quinn | 709/206 |
| 5,953,670 A | 9/1999 | Newson | |
| 5,959,543 A | 9/1999 | LaPorta et al. | 340/825.44 |
| 5,963,925 A | 10/1999 | Kolling et al. | |
| 5,969,543 A | 10/1999 | Erickson et al. | |
| 5,987,303 A | 11/1999 | Dutta et al. | |
| 5,987,439 A | 11/1999 | Gustin et al. | |
| 5,999,624 A | 12/1999 | Hopkins | |
| 6,014,636 A | 1/2000 | Reeder | |
| 6,035,104 A | 3/2000 | Zahariev | 395/200.33 |
| 6,044,362 A | 3/2000 | Neely | |
| 6,049,698 A | 4/2000 | Capers, Jr. et al. | 455/38.2 |
| 6,055,513 A | 4/2000 | Katz et al. | 705/26 |
| 6,078,820 A | 6/2000 | Wells et al. | 455/466 |
| 6,094,681 A | 7/2000 | Shaffer et al. | 709/224 |
| 6,128,603 A | 10/2000 | Dent et al. | |
| 6,138,158 A | 10/2000 | Boyle et al. | 709/225 |
| 6,167,253 A | 12/2000 | Farris et al. | 455/412 |
| 6,184,878 B1 | 2/2001 | Alonso et al. | |
| 6,230,970 B1 | 5/2001 | Walsh et al. | |
| 6,269,393 B1 | 7/2001 | Yost et al. | |
| 6,272,545 B1* | 8/2001 | Flanagin et al. | 709/228 |
| 6,289,324 B1 | 9/2001 | Kawan | |
| 6,301,567 B1 | 10/2001 | Leong et al. | |
| 6,311,058 B1 | 10/2001 | Wecker et al. | 455/418 |
| 6,317,885 B1 | 11/2001 | Fries | |
| 6,356,752 B1 | 3/2002 | Griffith | |
| 6,385,652 B1 | 5/2002 | Brown et al. | |
| 6,449,638 B1 | 9/2002 | Wecker et al. | 709/217 |
| 6,477,579 B1 | 11/2002 | Kunkle et al. | |
| 6,535,726 B1 | 3/2003 | Johnson | |
| 6,535,855 B1 | 3/2003 | Cahill et al. | |
| 6,536,661 B1 | 3/2003 | Takami et al. | |
| 6,553,412 B1 | 4/2003 | Kloba et al. | 709/219 |
| 6,609,106 B1 | 8/2003 | Robertson | 705/26 |
| 6,609,113 B1 | 8/2003 | O'Leary et al. | 705/39 |
| 6,633,910 B1 | 10/2003 | Rajan et al. | |
| 6,678,518 B2 | 1/2004 | Eerola | 455/422.1 |
| 6,694,316 B1 | 2/2004 | Langseth et al. | |
| 6,745,229 B1 | 6/2004 | Gobin et al. | |
| 6,952,645 B1 | 10/2005 | Jones | |
| 6,965,868 B1 | 11/2005 | Bednarek | 705/9 |
| 7,043,230 B1 | 5/2006 | Geddes et al. | |
| 7,113,801 B2 | 9/2006 | Back et al. | |
| 7,720,742 B1 | 5/2010 | Mauro et al. | |
| 2001/0041973 A1 | 11/2001 | Abkowitz et al. | 703/23 |
| 2001/0056387 A1 | 12/2001 | Magary et al. | |
| 2001/0056401 A1 | 12/2001 | Tompkins | 705/42 |
| 2002/0013711 A1 | 1/2002 | Ahuja et al. | |
| 2002/0035536 A1 | 3/2002 | Gellman | |
| 2002/0049788 A1 | 4/2002 | Lipkin et al. | 715/236 |
| 2002/0065752 A1 | 5/2002 | Lewis | |
| 2002/0065774 A1 | 5/2002 | Young et al. | 705/41 |
| 2002/0073236 A1 | 6/2002 | Helgeson et al. | 709/246 |
| 2002/0133462 A1 | 9/2002 | Shteyn | |
| 2003/0009426 A1 | 1/2003 | Ruiz-Sanchez | |
| 2003/0195797 A1 | 10/2003 | Klug | |
| 2004/0006538 A1 | 1/2004 | Steinberg et al. | |
| 2004/0158829 A1 | 8/2004 | Beresin et al. | |
| 2005/0027610 A1 | 2/2005 | Wharton | 705/26 |
| 2005/0027612 A1 | 2/2005 | Walker et al. | 705/26 |
| 2005/0176449 A1 | 8/2005 | Cui et al. | |
| 2006/0031784 A1 | 2/2006 | Makela | |
| 2006/0094411 A1 | 5/2006 | Dupont | |
| 2007/0060206 A1 | 3/2007 | Dam Nielsen et al. | |
| 2008/0096535 A1 | 4/2008 | Kim | |
| 2008/0126986 A1 | 5/2008 | Tsukiji | |

FOREIGN PATENT DOCUMENTS

| | | |
|---|---|---|
| EP | 1065634 | 1/2001 |
| EP | 1146459 | 10/2001 |
| EP | 1 168 293 | 1/2002 |
| EP | 1489535 | 12/2004 |
| GB | 2 333 421 | 7/1999 |
| WO | WO 97/22060 | 6/1997 |
| WO | WO 98/09260 | 3/1998 |
| WO | WO 98/24040 | 6/1998 |
| WO | WO 98/39868 | 9/1998 |
| WO | WO 99/13421 | 3/1999 |
| WO | WO 99/14711 A2 | 3/1999 |
| WO | WO 99/14711 A3 | 3/1999 |
| WO | WO 99/35595 | 7/1999 |
| WO | WO 00/46769 | 8/2000 |
| WO | WO 00/79818 | 12/2000 |
| WO | WO 02/33615 | 4/2002 |
| WO | WO 2004/112275 | 12/2004 |
| WO | WO 2005/079254 | 9/2005 |

OTHER PUBLICATIONS

Dispensing With Cheque: Part 5 Debit Cards, Smart Cards, Clearing & Settlement, Home-Banking, Electronic Payments International, No. 101, p. 8, Oct. 1995, 7 pages.

European Official Communication issued Dec. 17, 2008 in related Application No. EP07105497, 6 pages.

European Official Communication issued Jul. 30, 2007 in related Application No. EP01201396, 10 pages.

European Search Report issued Jun. 8, 2004 in related European Application No. EP 01912682, 4 pages.

European Search Report issued Apr. 5, 2007 in related European Application No. EP 06124645, 7 pages.

European Search Report issued Aug. 20, 2007 in related European Application No. EP 07105497, 9 pages.

FR2726146 published Apr. 26, 1996, English abstract, downloaded from espacenet, 1 page.

Gray, Here Comes Home Banking—Again, Credit Card Management, May 1994, p. 54, 3 pages.

International Preliminary Examination Report issued Sep. 24, 2002 in related PCT Application No. PCT/US01/03202, 3 pages.

International Search Report issued Jun. 18, 2001 for Application No. PCT/US01/03202, 1 page.

International Search Report issued Apr. 12, 2001 in related PCT Application PCT/US/0100947, 5 pages.

Kennedy, Eds, France Telecom, U.S. West Form Interactive4 Transaction Services Partnership, Business Wire, Nov. 1993, s. 1, p. 1, 3 pages.

Neely, What Price Convenience? The ATM surcharge Debate, The Regional Economist, Jul. 1997, downloaded from the internet: http://www.stlouisfed.org/publications/re/articles/?id=1783 on Jan. 3, 2011, 10 pages.

Terveen et al., "Helping Users Program Their Personal Agents", ACM Press SIGCHI Conference, 1996, pp. 355-361, 10 pages.

VISA Acquires Electronic Banking and Bill Payment Option, PR Newswire, Aug. 3, 1994, 4 pages.

Written Opinion issued Jun. 11, 2002 in related PCT Application No. PCT/US01/03202, 3 pages.

Sullivan, Eamonn, "Invasion-of-Privacy Fears Can Be Based on Fiction, Not Fact," V. 14, n. 23, p. 44, Jun. 9, 1997.

Bonner, Paul, "Cookie Recipes for Web-Page Builders," *Windows Sources*, vol. 4, n. 11, p. 209, Nov. 1997.

"Boost Value Added Services with SIM Application Toolkit" (A White Paper), Gemplus, Oct. 8, 1998, 19 pp.

Earls, Alan, "True Test of the Web—As the Web Moves to the Core of Business, Testing of Applications and Infrastructure is More Important Than Ever," *Informationweek*, n. 718, PGA 1, 1999.

Wolfe, Devin, "The Promise of Unified Messaging," *Network NA*, 5 pp., May 1, 1999.

Roselinsky, Milt, "Ready for Prime Time," *Telecommunications*, vol. 33, n. 6, p. 42, Jun. 1999.

Varshney, Upkar, Vetter, Ronald J., and Kalakota, Ravi, "Mobile Commerce: A New Frontier" [online], [retrieved on Dec. 28, 2000], 11 pp., Retrieved from the Internet: http://www.computer.org/computer/articles/October/Varshney/Varshney.html.

"Mobile Commerce" [online], Copyright 2000 [retrieved on Dec. 29, 2000], 1 p., Retrieved from the Internet: http://www.3rdfrontier.com/mobilecomm.htm.

"Electronic Commerce" [online], [retrieved on Dec. 29, 2000], 1 p., Retrieved from the Internet: http://www.3rdfrontier.com/elect.htm.

"After Singapore, India Gets 'CitiAlert'" [online], [retrieved on Mar. 21, 2001], 1 p., Retrieved from the Internet: http://www.banknetindia.com/issues/alert.htm.

"CitiAlert" [online], [retrieved on Mar. 21, 2001], 1 p. (5 of 5), Retrieved from the Internet: http://www.isolv.co.in/products.html.

"Citibank Brings CitiAlert to India—Expands Remote Banking Services with India's First Internet and Mobile-Based Money Alert Service" [online], Oct. 18, 2000 [retrieved on Mar. 21, 2001], 2 pp., Retrieved from the Internet: http://www.isolv.co.in/citibank.html.

"Citibank Unveils CitiAlert" [online], *Economics Times, Mumbai*, Oct. 18, 2000. Press Release Oct. 19, 2000 [retrieved on Mar. 21, 2001], 1 p., Retrieved from the Internet: http://www.isolv.co.in/etcitialert.html.

"Citibank Rides on Technology with CitiAlert" [online], *TheFinancial Express, Mumbai*, Oct. 18, 2000 [retrieved on Mar. 21, 2001], 1 p., Retrieved from the Internet: http://www.isolv.co.in/fexcitialert.html.

"You've Got Message . . . from CitiAlert" [online], Press Release, Aug. 19, 2000, *India Infoline*, Oct. 19, 2000 [retrieved on Mar. 21, 2001], 2 pp., Retrieved from the Internet: http://www.isolv.co.in/infolineca.html.

"CitiConnect Escrow Service, a Web-Enabled Escrow Service from Citibank" [online], Copyright 2001 [retrieved on Nov. 26, 2001], 5 pp., Retrieved from the Internet: http://www.citigroup.com/citigroup/net/b2b/ccon.htm.

"CitiConnect" [online], Copyright 2001 retrieved on Nov. 26, 2001, 1 p., Retrieved from the Internet: http://www.citissb.com/citiConnect/main.htm.

Muller-Veerse, Falk, "Mobile Commerce Report" [online], [retrieved on Apr. 2, 2002], 79 pp., Retrieved from the Internet: http://www.durlacher.com.

* cited by examiner

```
<mobile>
<html>
<head>
</head>
<body>
<form name=Form1 method=post action="Default.asp">
<card>
  Welcome to Citibank<br>
  Account
  <input name="LoginId" type="text" value="1234567890"
         format="*N"/>
  <br>
</card>
<card>
  Password
  <input name="pswd" type="password"/>
  <br>
</card>
<card>
  <input name="cmdSubmit" type="submit" value="Login"/>
  <input name="cmdSubmit" type="submit" value="Cancel"/>
</card>
</form>
</body>
</html>
</mobile>
```

Figure 6a

```
<html>
<head>
</head>
<body>
<form method="post" action="www.CitiMobile.com/ChtmlHome.asp?CrtSt=aaabbb">
Welcome to Citibank<br>
Account
<input type=text name=LoginId value="1234567890">
<br>
Password
<input type=password name=pswd>
<br>
<input type=submit name=cmdSubmit value="Login">
<input type=submit name=cmdSubmit value="Cancel">
</form>
</body>
</html>
```

Figure 6b

```
<mobile>
<html>
<head>
</head>
<body>
<form name="Form1" method=post action="Default.asp">
<card>
Welcome to Citibank<br>
Account
<input name="LoginId" type="text" value="1234567890"
       format="*N"/>
<br>
</card>
<card>
Password
<input name="pswd" type="password"/>
<br>
</card>
<card>
<input name="cmdSubmit" type="submit" value="Login"/>
<input name="cmdSubmit" type="submit" value="Cancel"/>
</card>
</form>
</body>
</html>
</mobile>
```

Figure 7a

```
<%Response.ContentType="text/x-hdml"%>
<hdml Version=3.0 ttl=0 markable=false>
<Entry name=c01 key=LoginId Format="*N" default="1234567890">
<action type=accept task=go dest="#c02">
Welcome to Citibank<BR>
Account
</Entry>
<Entry name=c02 key=pswd Format="*N" NOECHO=true default="">
  <action type=accept task=go  dest="#c98">
  Password
</Entry>
<choice name=c98 key=cmdSubmit>
<ce value="Login" task=go DEST=#c99>Login
<ce value="Cancel" task=go DEST=#c99>Cancel
</choice>
<nodisplay name=c99>
<action type=accept task=go
  method=post dest="www.CitiMobile.com/HdmlHome.asp?CrtSt=aaabbb"
  postdata="LoginId=$(LoginId)&pswd=$(pswd)&cmdSubmit=$(cmdSubmit)">
</nodisplay>
</hdml>
```

Figure 7b

```
<mobile>
<html>
<head>
</head>
<body>
<form name=Form1 method=post action="Default.asp">
  <card>
    Welcome to Citibank<br>
    Account
    <input name="LoginId" type="text" value="1234567890"
           format="*N"/>
    <br>
  </card>
  <card>
    Password
    <input name="pswd" type="password"/>
    <br>
  </card>
  <card>
    <input name="cmdSubmit" type="submit" value="Login"/>
    <input name="cmdSubmit" type="submit" value="Cancel"/>
  </card>
</form>
</body>
</html>
</mobile>
```

Figure 8a

```
<%Response.ContentType="text/vnd.wap.wml"%>
<?xml version="1.0"?>
<!DOCTYPE wml PUBLIC "-//WAPFORUM//DTD WML 1.1//EN"
   "http://www.wapforum.org/DTD/wml_1.1.xml">
<wml>
<card id="c01">
<do type="accept"><go href="#c02"/></do>
<p>
Welcome to Citibank<BR>
Account
<input name="LoginId" format="*N" value="1234567890"/>
</p>
</card>
<card id="c02">
  <do type="accept"><go href="#c98"/></do>
  <p>
  Password
  <input name="pswd" type="password"/>
  </p>
</card>
<card id="c98">
<do type="accept"><go href="#c99"/></do>
<p>
<select name="cmdSubmit">
  <option value="Login">Login</option>
  <option value="Cancel">Cancel</option>
</select>
</p>
</card>
<card id="c99">
<onevent type="onenterforward">
  <go method="post"
      href="www.CitiMobile.com/WapHome.asp?CrtSt=aaabbb">
    <postfield name="LoginId" value="$(LoginId)"/>
    <postfield name="pswd" value="$(pswd)"/>
    <postfield name="cmdSubmit" value="$(cmdSubmit)"/>
  </go>
</onevent>
</card>
</wml>
```

Figure 8b

```
<mobile>
<html>
<head>
</head>
<body>
<form name=Form1 method=post action="Default.asp"
    <card>
        Welcome to Citibank<br>
        Account
        <input name="LoginId" type="text" value="1234567890"
            format="*N"/>
        <br>
    </card>
    <card>
        Password
        <input name="pswd" type="password"/>
        <br>
    </card>
    <card>
        <input name ="cmdSubmit" type="submit" value="Login">
        <input name="cmdSubmit" type="submit" value="Cancel">
    </card>
</form>
</body>
</html>
</mobile>
```

Figure 9a

```
<html>
<head>
</head>
<body>
<form method="post" action="www.CitiMobile.com/ChtmlHome.asp?CrtSt=aaabbb">
Welcome to Citibank<br>
Account
<input type=text name=LoginId value="1234567890">
<br>
Password
<input type=password name=pswd>
<br>
<input type=submit name=cmdSubmit value="Login">
<input type=submit name=cmdSubmit value="Cancel">
</form>
</body>
</html>
```

Figure 9b

METHOD AND SYSTEM FOR CONDUCTING COMMERCE OVER A WIRELESS COMMUNICATION NETWORK

CROSS-REFERENCE TO RELATED APPLICATIONS

This application is a continuation of co-pending U.S. patent application Ser. No. 10/028,718 filed Dec. 28, 2001, entitled "METHOD AND SYSTEM FOR CONDUCTING COMMERCE OVER A WIRELESS COMMUNICATION NETWORK", claiming priority to Provisional Application No. 60/258,495, filed Dec. 29, 2000, the disclosures of both of which are specifically incorporated herein by this reference.

Further, the current application references and incorporates by reference in its entirety U.S. patent application Ser. No. 09/832,863, entitled "METHOD AND SYSTEM FOR NOTIFYING CUSTOMERS OF TRANSACTION OPPORTUNITIES," filed Apr. 12, 2001.

BACKGROUND OF THE INVENTION

1. Field of the Invention

The present invention relates to a method and system for conducting commerce over a wireless communication network. The present invention further relates to a system and method for using radio-based wireless devices such as cell phones and personal digital assistants to conduct business-to-business and business-to-consumer transactions over an electronic commerce system.

2. Description of Related Art

With the explosion of the Internet as a new indispensable worldwide medium, the web is becoming an integral part of our daily personal and working lives. Electronic commerce continues to see phenomenal growth, but so far most e-commerce developments have involved wired infrastructures.

In this new knowledge economy that puts increased demands on every individual's time, mobility will become an essential, relevant and important tool. While the Internet allows real-time communication and transactions, online accessibility has been restricted to PCs. With the advancement of wireless network technologies, electronic commerce through the Internet has extended itself to incorporate new business opportunities in the arena of mobile commerce (m-commerce).

In the field of m-commerce, there are significant restrictions on the efficiency and variety of m-commerce transactions that are available. Current technology is either limited to off-line payment or to restricted merchant specific on-line mobile payment through a mobile phone using a smart card, wherein the mobile phone must contain a dual slot smart card reader. Other m-commerce payment processes include dialing a premium rate number, e.g., 900-number, which has a call charge equivalent to the product price, dialing a prefix plus a premium rate number to indicate that the product should be charged to a different number for billing, and developing a pre-standing agreement for credit card payments, wherein a PIN has to be entered at the time of purchase to validate the user. These payment solutions offer no variety in payment methods and are limited to participating vendors, e.g., off-line vending machines. Further, m-commerce payment limitations affect mobile shopping, mobile retailing, and mobile ticketing. While electronic shopping, retailing, and ticketing have been available for some time, there are additional steps required to complete a mobile transaction. On-line mobile payments, shopping, retailing, ticketing, etc., require language recognition and or conversion in order to complete transactions with electronic merchants and payment authorization systems. Consequently, there is a need for a system and method of performing mobile commerce which facilitates interaction between mobile and electronic components which utilize differing protocols and languages.

BRIEF DESCRIPTION OF THE DRAWINGS

In the Figures:

FIGS. 6a-6b illustrate message formats according to an embodiment of the present invention;

FIGS. 7a-7b illustrate message formats according to an embodiment of the present invention;

FIG. 8a-8b illustrate message formats according to an embodiment of the present invention;

FIG. 9a-9b illustrate message formats according to an embodiment of the present invention;

BRIEF SUMMARY OF THE INVENTION

Figure 1:
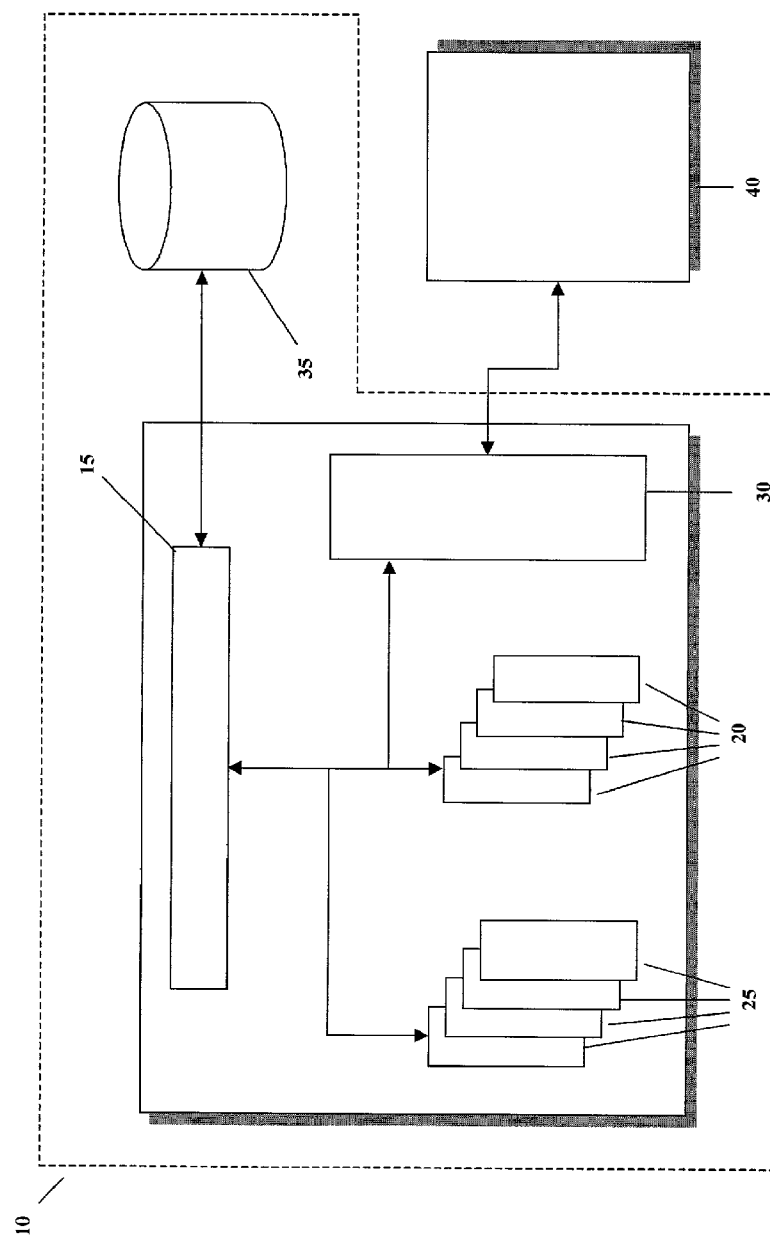
FIG. 1 illustrates a mobile system according to an embodiment of the present invention.

The present invention is an enabling product that facilitates implementation of an m-commerce business solution. According to an embodiment of the present invention an m-commerce solution includes: a content provider or merchant site (e.g., an eMall, financial institution, etc.) (hereafter "merchant site") providing the products and goods to be purchased; a payment system allowing online authorization of funds to purchase the goods; and a wireless network for all customer interactions. Preferred embodiments of the present invention perform at least one of the following three functions: 1) protocol conversions; 2) customer information reposing, and 3) payment authorization system interfacing.

The protocol conversion aspect of the present invention, according to at least one embodiment, converts content (e.g., messages) developed in one of a multitude of languages, such as, HTML (hyper text mark-up language), compact HTML (CHTML), or XML (extensible mark-up language) to an appropriate language for a receiving device, such as, Wireless Markup Language (WML), HDML (handheld device mark-up language or UP Browser), CHTML and vice versa. The customer information repository aspect of the present invention, according to at least one embodiment, contains various customer information such as a preferred shipping address; a list of credit cards, debit cards, and/or other payment vehicles, including, but not limited to, credit card types and card numbers that may be used for a purchase transaction; and a customer identifier, such as, a mobile device subscriber identification ("ID") number.

The payment authorization system interface aspect of the present invention, according to one embodiment, provides interface logic with a payment authorization system to facilitate the authorization of a commerce transaction.

More particularly, an embodiment of the present invention is directed to a mobile commerce system that comprises at least one mobile device for transmitting and receiving data in a first language, a platform for transmitting and receiving data in the first language and data in a second language, at least one merchant site for transmitting and receiving data in the second language, and a payment authorization system for transmitting and receiving data in the second language.

Another embodiment of the present invention includes a method for conducting mobile commerce. This method comprises: transmitting in a first language a request message for merchant website information from a mobile device; receiving the request message in the first language at a platform and identifying the first language; translating the request message at the platform from the first language to a second language that is recognizable by a merchant website; communicating the translated request message in the second language from the platform to the merchant website; receiving at the platform the requested merchant website information from the merchant website in the second language; recognizing the second language at the platform; parsing the requested merchant website information in the second language into translatable pieces; translating the translatable pieces of the requested website information into the first language so as to form a reply message containing the requested merchant website information in the first language; and transmitting the reply message to the mobile device.

These and other aspects and embodiments of the present invention are set forth below with details.

DETAILED DESCRIPTION OF THE PREFERRED EMBODIMENTS OF THE PRESENT INVENTION

For purposes of this disclosure, the terms mobile commerce (m-commerce), mobile electronic commerce, and wireless electronic commerce may be used interchangeably. The term m-commerce represents a subset of all e-commerce transactions, both in the business-to-business (B2B) and the business-to-consumer (B2C) area.

The present invention provides a mobile system for facilitating mobile commerce among multiple parties. In the preferred embodiments of the present invention, the mobile system performs at least one, and preferably all three of the following three functions: 1) protocol conversions; 2) customer information reposing, and 3) payment authorization system interfacing. The mobile system achieves these functions using at least one of the following components: a state manager; parsing agents for parsing e.g., XML and HTML; translation agents for translating to and from e.g., WAP, CHTML and HDML; communication agents for communicating between e.g., HTTP (HyperText Transfer Protocol) and HTTPS (Secure HyperText Transfer Protocol); server and database configurations; and settlement systems.

In facilitating protocol conversions, the mobile system enables the delivery of a single sourced web content to a wide range of wireless devices or mobile devices (hereafter "mobile devices") and vice versa. The mobile system is capable of presenting a transmission from a mobile device to participating Web servers as a standard Web client, thus performing a gateway/protocol conversion function between a mobile device and a merchant site or sites. To accomplish this, the mobile system allows users of mobile devices to communicate through the web with merchant site applications running on web servers using, for example, HTTP or HTTPS protocols. According to the embodiments of the present invention, the mobile system dynamically performs the required translation between the merchant site webpages encoded in, for example, HTML, CHTML, XHTML or XML to WML, CHTML or HDML for the mobile device.

According to further embodiments of the present invention, the mobile system also manages the state and associated context information between the merchant site and the associated mobile device(s). This information includes, for example, HTTP session state, cookies, links and/or universal resource locators (URLs) referenced during the session and control information for each HTML page. As most mobile devices currently do not support cookies, the mobile system manages the persistent store associated with each cookie on behalf of the mobile device.

According to embodiments of the present invention, the mobile system is integratable with existing merchant sites, such as, an eMall for m-commerce applications or Citibank Direct Access in the case of banking transactions. The merchant site operations experience very little interruption. For example, the merchant sites continue to receive and transmit HTTP and HTTPS messages for incoming requests and continue to dictate screen flow.

As described further below, the mobile system offers a scalable architecture, allowing concurrent access by mobile users to HTTP and HTTPS pages served on merchant sites. In an embodiment of the present invention, the scalable architecture is developed on Windows 2000 using COM+ services and at least one Microsoft SQL Server in order to support high numbers of concurrent mobile users on a single server, and includes the ability to add more servers as business requirements dictate. The mobile system can use standards such as COM (Component Object Model), SSL (Secure Sockets Layer), HTTP, WAP, HDML, CHTML, XML and HTML. Using SSL communications, every transmission between the client and the server is encrypted.

Referring to FIG. 1, the component architecture of a mobile system 10 includes the state manager 15 which is responsible for creating and coordinating activities among the translation agents 20, the parsing agents 25 and communication agents 30. The communication agent is the last component of the architecture prior to the merchant site 40. Additionally, all state information, such as session states, cookies, mobile identifications, links and control information on each HTML page is stored in a relational database 35 for ease of access and manipulation by the state manager 15.

In order to perform merchant site format translation to mobile device format, the mobile system insures that all communication between the merchant site and the mobile device occurs through the mobile system architecture. Using the mobile system's link/URL management feature, this is insured by dynamically converting all Hyperlink (Href) information on the page published by the merchant site to the URL (universal resource locator) of the mobile system (e.g., URL of the company offering the services of the mobile system). The mobile system saves the original, unconverted URLs within a relational database 35. In this manner, all user interaction from the mobile device is intercepted and interpreted by the mobile system prior to being forwarded to the merchant site.

In another feature of the present invention, since most mobile devices currently do not provide support for cookies, the state manager component manages the persistent store associated with each cookie on behalf of the mobile device. For instance, if the target HTML page on the merchant site writes a cookie, that cookie is stored on the mobile system on behalf of the mobile device and is returned only when the response is posted to the appropriate merchant site. The mobile system's cookie management insures integrity of the cookies by insuring proper domain association as well as lifetime expectancy.

The parsing agents 25 of FIG. 1, are responsible for parsing the webpage on the target merchant site 40. The supported encoding are web-based mixed text and image languages, such as, HTML and XML. The parsing agent 25 parses the entire webpage and effectively builds a document tree according to the supported tags, such as those listed in the Table below for HTML and XML. Translation agents 20 use a set of rules to determine the best way to render webpages generated by a merchant site 40 on a mobile device screen. Translation agents 20 emulate an HTML session and provide equivalent translation to the respective mobile device format (e.g., CHTML, WML or HDML) based on individual language syntax. Finally, communication agents 30 are responsible for communication with the merchant site 40. Supported agents are HTTP and HTTPS. The communication agent establishes and monitors connections and manages time outs. The following state table contains an exemplary list of all supported HTML and XML tags and the attributes associated therewith by the mobile system. This table also describes the associated support for each translator type as currently implemented.

TABLE 1

| Tag Name | Name | Attributes supported | WAP | HDML | Imode | Comments |
|---|---|---|---|---|---|---|
| A | Anchor | Href | ☑ | ☑ | ☑ | All Translators also support the "Tel" attribute to allow the mobile device to initiate a voice call. |
| B | Bold | | ☑ | ☑ | ☑ | |
| BR | Break | | ☑ | ☑ | ☑ | |
| BODY | Body | | ☒ | ☒ | ☒ | All Translators: This tag is a non-operational ("NOP"). |
| FRAME | Frame | | ☑ | ☑ | | Imode Translator: This tag is a "NOP". The <FRAME> tag is newly introduced tag for the invented mobile system to handle encapsulation of unit of UI representation on a mobile device (e.g. HDML/WMLCard) |
| CENTER | Center | | ☑ | ☑ | ☑ | |
| DIV | Division | | ☑ | ☑ | ☑ | All Translators: Treat "DIV" tag as a "P" tag. |
| FORM | Form | Name, Action | ☑ | ☑ | ☑ | |
| HEAD | Header | | | | | All Translators: This tag is a "NOP". |
| H1 | Heading 1 | | | | ☑ | WAP and HDML Translators: This tag is a "NOP". |
| H2 | Heading 2 | | | | ☑ | WAP and HDML Translators: This tag is a "NOP". |
| H3 | Heading 3 | | | | ☑ | WAP and HDML Translators: This tag is a "NOP". |
| H4 | Heading 4 | | | | ☑ | WAP and HDML Translators: This tag is a "NOP". |
| H5 | Heading 5 | | | | ☑ | WAP and HDML Translators: This tag is a "NOP". |
| H6 | Heading 6 | | | | ☑ | WAP and HDML Translators: This tag is a "NOP". |
| HR | Horizontal Rule | Align | | | ☑ | WAP and HDML Translators: This tag is a "NOP". |
| HTML | Html | | | | | All Translators: This tag is a "NOP". |
| IMG | Image | Align, Src | ☑ | | ☑ | |
| INPUT | Input | Name, Type, Value | ☑ | ☑ | ☑ | WAP and HDML Translators: Only support "text", "password", "hidden" and "submit" types. |
| Option | Option | Value, Selected | ☑ | ☑ | ☑ | |
| P | Paragraph | Align, Mode | ☑ | ☑ | ☑ | HDML Translator: Only supports "nowrap" mode. All other attributes are ignored. |
| Pre | Preformatted | | ☑ | ☑ | ☑ | |
| Select | Select | Name, Default | ☑ | ☑ | ☑ | |

TABLE 1-continued

| Tag Name | Name | Attributes supported | WAP | HDML | Imode | Comments |
|---|---|---|---|---|---|---|
| TextArea | Text Area | Name, Rows, Cols | ☑ | ☑ | ☑ | WAP and HDML Translators: Handles as an Input tag with Rows attribute of "Text" and no support for "Cols" attribute. |
| Title | Title | | ☑ | ☑ | ☑ | |

Figure 2:
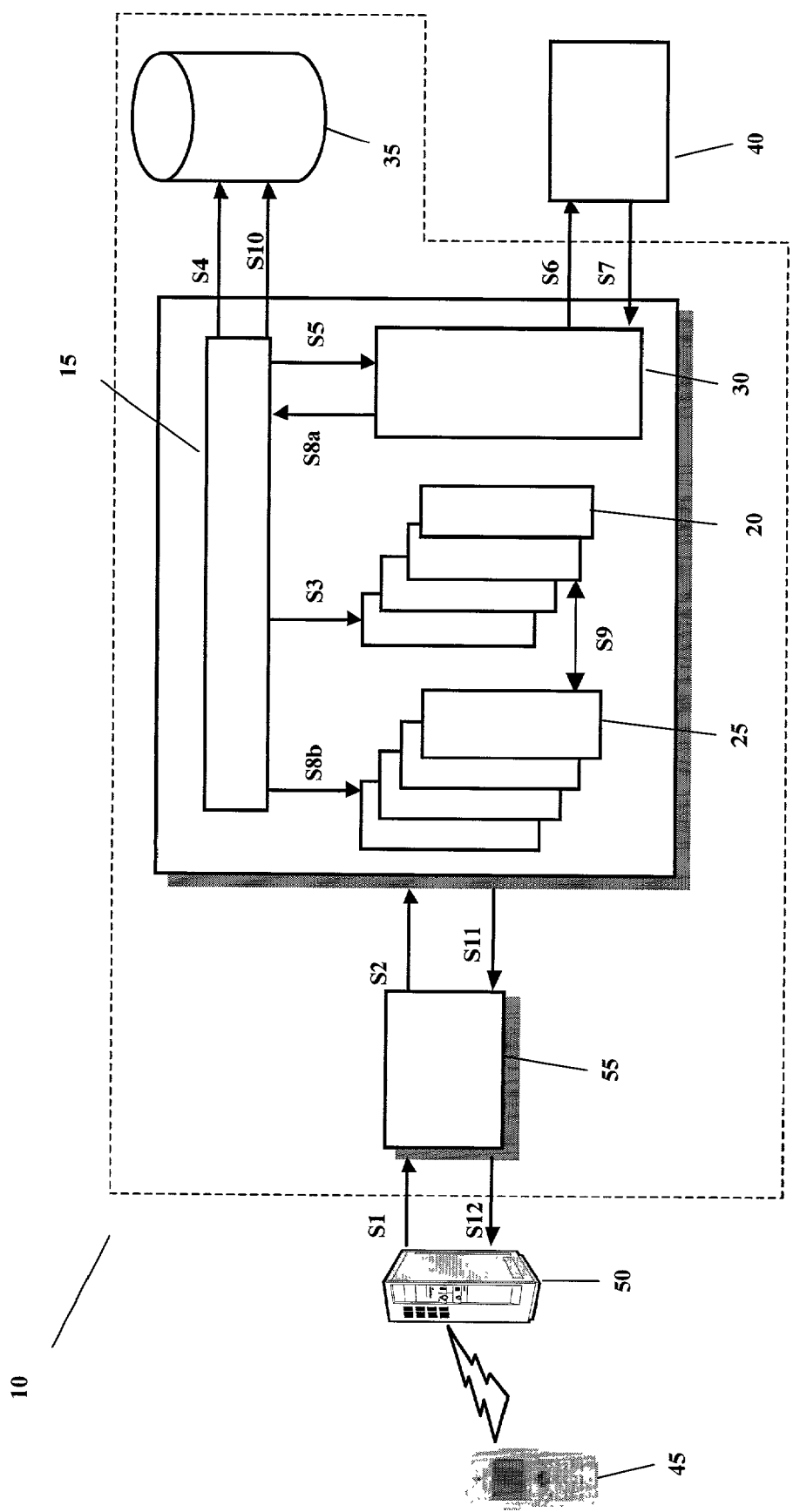
FIG. 2 illustrates a first system and method for conducting mobile commerce according to an embodiment of the present invention.

According to an embodiment of the present invention, an exemplary interaction between a merchant site and a mobile device through the mobile system for displaying a single webpage is as follows. Referring to FIG. 2, initially, a user or customer (hereafter "customer") hits the mobile systems URL using the customer's web enabled mobile device 45. This request is delivered to the phone gateway 50 and the Active Server Page ("ASP") component 55, S1 of the mobile system 10 which performs an HTTP post to the state manager 15 within the mobile system S2. The HTTP post includes the type of mobile device 45 communicating with the mobile system 10, particularly, the language used in the communication, e.g., CHTML, WML or HDML and, if available, a mobile identification number. The state manager component 15 engages the appropriate translation agent 20 based on the type of mobile device identified S3. If existent already, the state manager 15 restores all session information from the persistent store through the relational database 35 on behalf of the identified mobile device through a received mobile identification number 45, S4. If not already existing in the relational databases 35, session information is saved therein, including a mobile identification number for the device S4. The session information includes session state, cookies, links and other control information. By way of example, session information is utilized in a situation wherein the interaction between the mobile device 45 and the merchant site 40 is a continuation of an existing interaction (e.g., an ongoing Direct Access customer session), such that previous session information exists for of the mobile device 45.

After retrieving the session information, the state manager 15 engages the communication agent 30, S5. An HTTP or HTTPS Post is performed to the merchant site 40 based on existing link (e.g., HREF) information in the state tables (See Table 1) S6. The merchant site webpage response is returned to the communication agent S7. Based on the webpage content, the communication agent 30 determines the encoding thereof, e.g., HTML or XML, and engages through the state manager 15, the appropriate parsing agent 25 to parse the response S8a, S8b. For each item parsed in the merchant site webpage, the parsing agent 25, in conjunction with the translation agent 20, dynamically performs the associated translation to the predetermined mobile device format S9. This step is repeated until the entire merchant site webpage has been parsed and translated to the predetermined mobile device format. For example, from HTML to WML for a WAP mobile device. All session information is saved to the persistent store, i.e., relational database, on behalf of this mobile device under a mobile device ID (e.g., alphanumeric identifier) S10. As described above with reference to S3, this session information is later retrievable during the next interaction between the mobile device 45 and the merchant site 40. The translated response is returned to the ASP thread S11 through an HTTP response and on to the mobile device 45 through the phone gateway 50, S12.

Figure 3A:
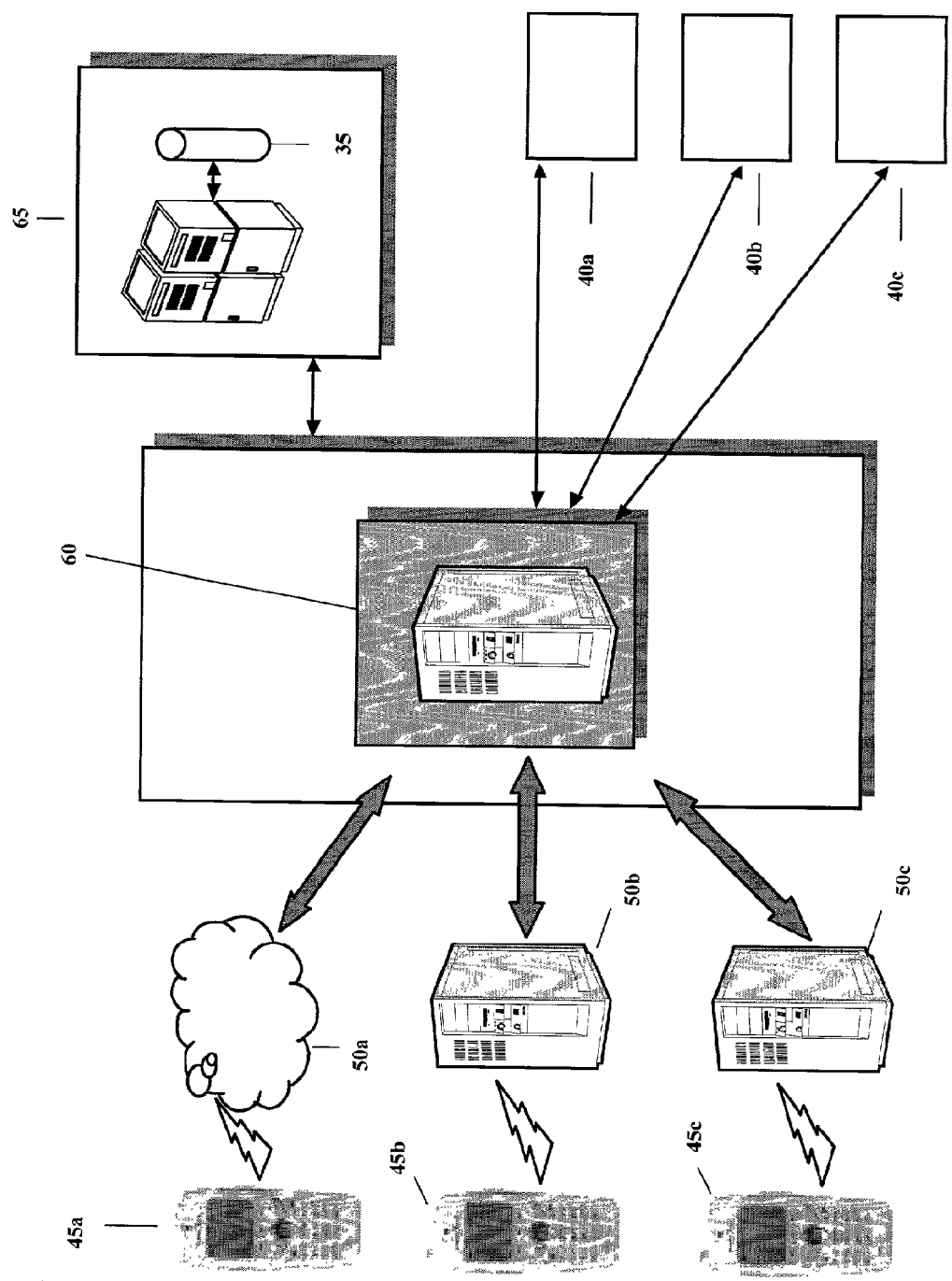
FIGS. 3a and 3b illustrate second and third systems for conducting mobile commerce according to embodiments of the present invention.
Figure 3B:
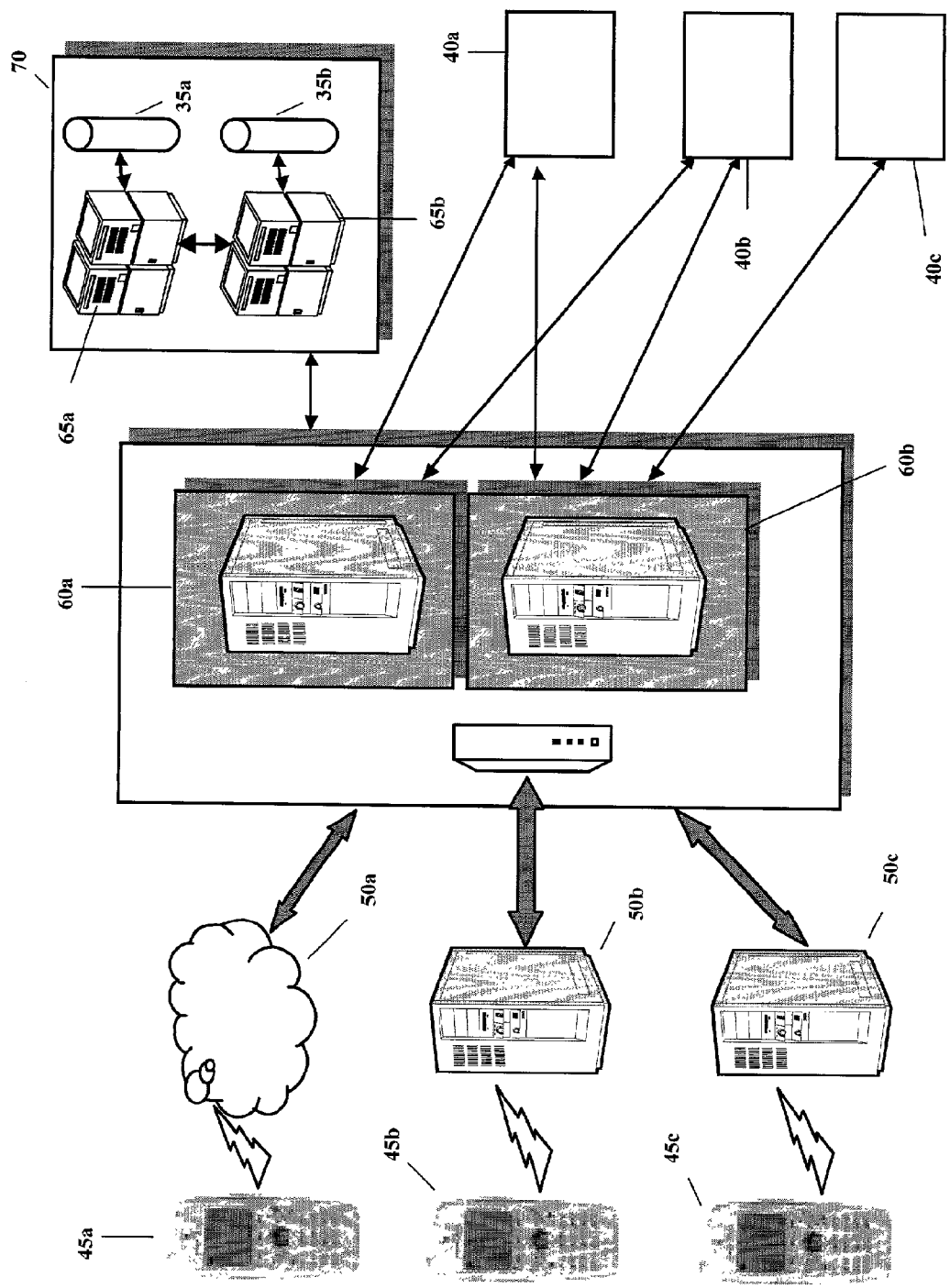

Referring to FIGS. 3a and 3b, network architectures for deployment of the mobile system according to embodiments of the present invention are illustrated. Examples of the various telephone networks and associated gateway infrastructure have also been included in FIGS. 3a and 3b. In FIG. 3a, the network architecture includes at least one server 60 which contains, for example, the state manager component and the parsing, communication, and translation agents (see FIGS. 1 and 2). In this particular embodiment of the present invention, the server 60 is located in the DMZ ("Demilitarized Zone") so that the company hosting the mobile system can do so without sacrificing unauthorized access to the company's private network. The DMZ sits between the Internet and an internal network's line of defense which is usually some combination of firewalls and bastion hosts. The persistent data store, i.e., relational database 35, resides on an SQL server 65 which is inside a firewall and on a private network, such as a GRN ("Global Routed Network"). FIG. 3a also illustrates examples of three different telephone gateways 50a, 50b, and 50c through which mobile devices 45a, 45b, and 45c communicate with the mobile system and ultimately with the merchant sites 40a, 40b, and 40c. By way of example, telephone gateway 50a is a Imode network, 50b is a WAP gateway and 50c is an HDML gateway.

FIG. 3b illustrates the enhanced scalability available with the mobile system of the present invention. Although the mobile system is capable of handling a high number of concurrent mobile users 45a-45c on a single server, the mobile system includes the ability to add more servers as business requirements dictate. This enhanced scalability is optimized through the use of services such as, Microsoft's COM+ services. The mobile system supports a multi-tiered architecture, separating the application logic and data components. This allows for greater scalability based on the projected requirements. In FIG. 3b a farm of servers including servers 60a and 60b is created to support high concurrent volume requirements. The system data is committed to persistent store on SQL servers 65a and 65b, which can be expanded to a cluster of SQL servers 70 through replication to support high concurrent volumes. High availability can be addressed similar to the manner outlined above, where either of several servers 60a and 60b can perform the necessary processing on behalf of a mobile device 45a-45c. Replication of SQL servers 65a and 65b also allows for higher availability of data in the event that one SQL server 65a or 65b is inaccessible.

According to an embodiment of the present invention, the mobile system is designed to provide hosting support for multiple entities (e.g., businesses) within the company providing the mobile system, while utilizing the same physical hardware. For example, hosting multiple mobile system URLs on the same physical server provides the foundation for this capability. The persistent store associated with each business within the company is preserved in different database tables and is indexed by the ID of the current entity being serviced for each mobile device interaction.

Figure 4:
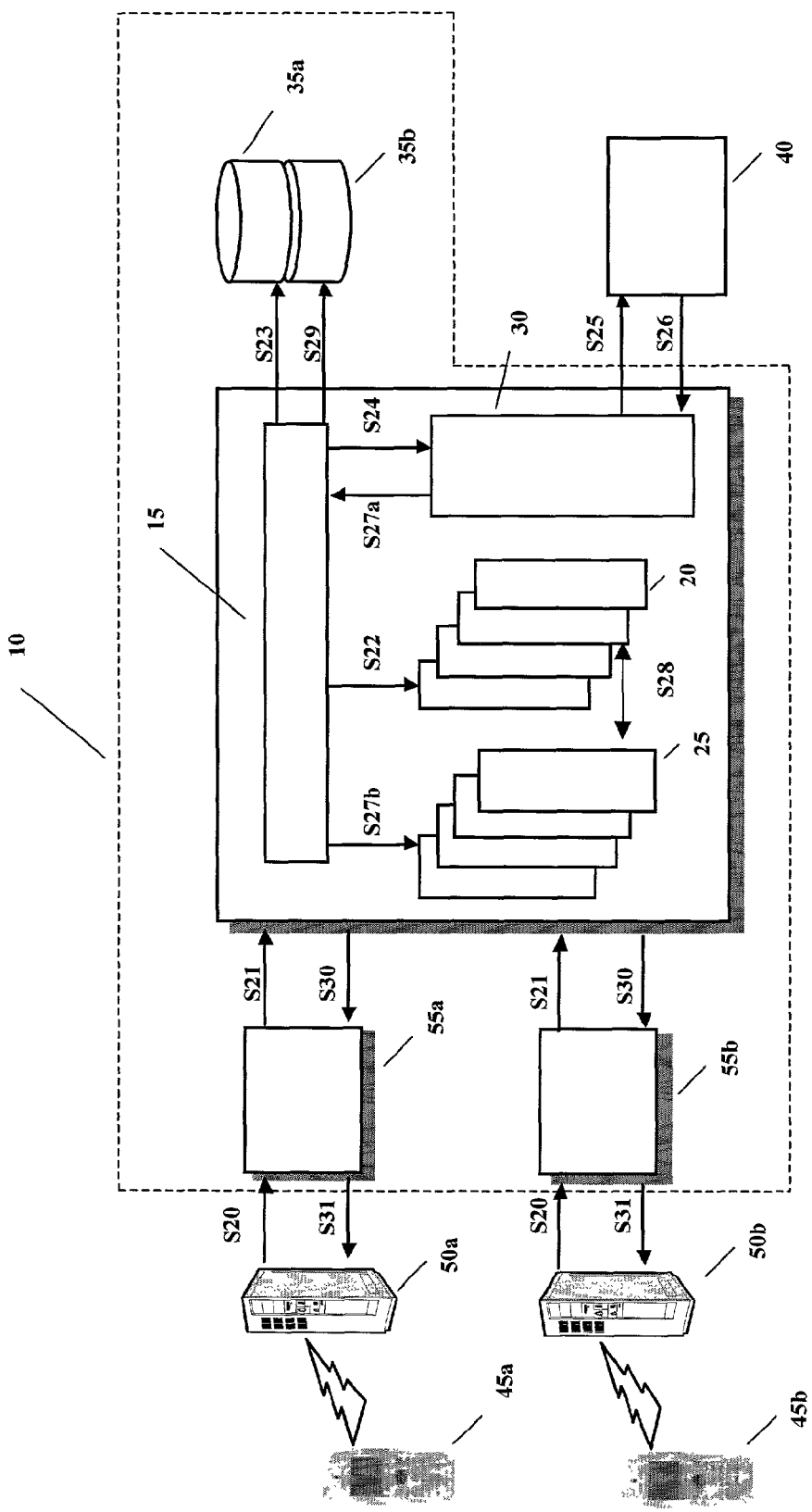
FIG. 4 illustrates a fourth system for conducting mobile commerce according to an embodiment of the present invention.

Referring to FIG. 4, the architecture associated with the multi-entity hosting mobile system and the process for using the multi-entity mobile system are illustrated. Initially, a user or customer (hereafter "customer") hits the mobile systems URL using the customer's web enabled mobile device 45*a*, 45*b*. In FIG. 4, there are two mobile system URLs, illustrating the ability of the mobile system to handle the needs of two separate entities. This request is delivered to a phone gateway 50*a*, 50*b* and then HTTP Posts to the ASP components 55*a* and 55*b* of the mobile system are performed S20. The type of mobile device communicating with the mobile system 10, more particularly, the language used in the communication, e.g., CHTML, WML or HDML, is identified to the mobile system S21. Further, within this step, a business identification (ID) associated with the URL is identified and passed on to the mobile system as a parameter that is considered during all processing of messages involving the business ID. The state manager component 15 engages the appropriate translation agent 20 based on the type of mobile device 45*a*, 45*b* identified S22. If existent, the state manager 15 restores all session information from the persistent store through the appropriate relational database 35*a*, 35*b* on behalf of the identified mobile device and business ID S23. The session information includes session state, cookies, links and other control information. In a particular embodiment, session information is utilized in a situation wherein the interaction between mobile device 45*a*, 45*b* and merchant site 40 is a continuation of an existing interaction (i.e., an ongoing direct access customer session), such that previous session information exists for of the mobile device 45*a*, 45*b*.

After retrieving the session information, the state manager 15 engages the communication agent 30, S24. An HTTP or HTTPS Post is performed to the merchant site 40 based on existing link (HREF) information in the state tables (See Table 1) S25. The merchant site response (e.g., Webpage) is returned to the communication agent S26. Based on the response content, the communication agent 30 determines the encoding thereof, e.g., HTML or XML, and engages through the state manager 15, the appropriate parsing agent 25 to parse the response S27*a*, S27*b*. For each item parsed in the response, the parsing agent 25, in conjunction with the translation agent 20, dynamically performs the associated translation to the predetermined mobile device format S28. This step is repeated until the entire response has been parsed and translated to the predetermined mobile device format. For example, from HTML to WML for a WAP mobile device. All session information is saved to the appropriate persistent store, i.e., relational database 35*a*, 35*b*, on behalf of this mobile device using the mobile device identification number for the business ID S29. As described above with reference to S22, this session information is later retrievable during the next interaction between the mobile device 45*a*, 45*b* and the merchant site 40. The translated response is returned to the ASP thread S30 through an HTTP response and on to the mobile device 45*a*, 45*b* through the phone gateway 50*a*, 50*b*, S31.

As described generally above with reference to the mobile system components, protocol converters are used within the mobile system in order to reformat received content or messages (hereafter "messages"). The reformatted messages can then be sent from and to different types of mobile devices. This enables content providers to deliver a single marked-up message to a wide range of wireless devices. The phrase "mobile device" is not intended to be limited to telephones, but rather this phrase encompasses all mobile or portable communication devices which communicate over wireless phone lines. The protocol converter converts website messages (e.g., from merchants) to a specific mobile device message format and vice versa. The protocol converter converts, by way of non-limiting example, content developed in HTML, Compact HTML, or XML to Wireless Markup Language (WML), HDML (UP Browser), CHTML or Imode. Any source message, e.g., message received, can be converted to any of the possible target message formats, target messages being the messages that are being sent.

Figures 5A, 5B:
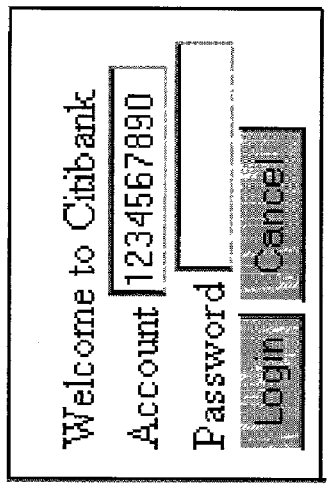
FIGS. 5a-5b illustrate message formats according to an embodiment of the present invention.

In a first protocol conversion example, existing source HTML messages are initially reformatted in order to support XML specifications. Referring to FIGS. 5*a* and 5*b*, an exemplary HTML message in its source format FIG. 5*a* and its counterpart viewable browser format FIG. 5*b*, prior to reformatting are illustrated. These formats cannot be read and understood by a mobile device. In an embodiment of the present invention, existing source HTML as shown in FIGS. 5*a* and 5*b*, is modified from the source HTML shown in FIG. 6*a*, to the modified HTML shown in 6*b* by the merchant site in order to support the XML tags which identify the message to the mobile system. In an exemplary embodiment, a mobile system includes a <script TYPE="MOBILE"> tag and <card> tag, wherein the body of code encapsulated within the <script> tag is only interpreted by the mobile system of the present invention. The body of code encapsulated within a <card> tag represents to the mobile system that the message represents a single user interaction on a mobile device. Once the message is recognized and read by the mobile system, the mobile system is able to convert the code so that the message contents can be recognized and read by the mobile device to which the message is directed. FIGS. 7*a* and 7*b* show the pre-conversion HTML/XML language from FIG. 6*b* and the post-conversion HDML language as converted by the mobile system. Similarly, FIGS. 8*a* and 8*b* show the pre-conversion HTML/XML language from FIG. 6*b* and the post-conversion WML language as converted by the mobile system and FIGS. 9*a* and 9*b* show the pre-conversion HTML/XML language from FIG. 6*b* and the post-conversion CHTML language as converted by the mobile system. These embodiments are intended to be merely exemplary and non-limiting. One skilled in the art recognizes the multiple language conversions that may be performed as dictated only by the receiving language of the mobile device. Other conversion embodiments are contemplated by this invention and are incorporated herein by reference as they are known and understood by those skilled in the art.

The customer information repository is stored and provided in order to minimize the amount of input that a customer has to enter while conducting an m-commerce transaction. Minimizing the amount of customer input increases the speed and simplicity of m-commerce transactions, which is very much in keeping with the fundamental idea of mobile commerce. In addition, wireless phone devices are not generally equipped with a robust keypad interface. Therefore, it is important to minimize the amount of information collected from a customer during a transaction. The information stored within the customer information repository, includes, but is not limited to, billing addresses, shipping addresses, a list of credit cards or payment vehicles that may be used for a purchase transaction and a mobile device subscriber ID. The information is gathered during one of multiple m-commerce service registration processes that are available. For example, the information can be gathered during the customer self-registration process through a web site facility or via staff-assisted registration. Alternatively, customer registration may be accomplished via a batch facility wherein a batch file containing registration information for all customers is updated and accessed. The information is linked to the customers mobile device ID (e.g., number, alphanumeric) so at a later time when the customer chooses to make a transaction, the system of the present invention is able to access the customers' personal information. Instead of requiring, for example, a customer to enter the credit card number of the credit card they would like to use during a transaction, the system will prompt the customer to choose which of their pre-registered credit cards they would like to use. Additional required customer enrollment fields can be added based on individual business requirements.

Payment gateways or settlement systems are provided to manage the interface with the payment authorization systems. The payment gateway generates payment authorization requests to the payment engine and then returns the results of the authorization request to the merchant for order fulfillment. The present invention can support a variety of interfaces to the payment authorization system, including, but not limited to, an HTTP(s) post to a secure website payment system or a Microsoft COM-based interface to an ECS payment engine and the CitiConnect system used by, for example, the Global Cash and Trade organization.

Additionally, the mobile system of the present invention may be integrated and can co-reside in business installations with other m-commerce related services, such as the financial transaction and event notification systems (hereinafter "notification system") described in U.S. patent application Ser. No. 09/832,863, entitled "METHOD AND SYSTEM FOR NOTIFYING CUSTOMERS OF TRANSACTION OPPORTUNITIES" the entirety of which is incorporated herein by reference. The notification system, in conjunction with the mobile system, provide, by way of example, the following additional services: specific account notifications, such as past-due-date reminders, overdrafts, credit limits, specific credit charges (e.g., single amount charges, location charges), credit fraud warnings (e.g., based on unfamiliar pattern of charges, location of charges, amount of charges) direct deposits (e.g., of salary, dividend, etc.), balance, credit card due dates, automatic bill payments, check clearing alert and ATM withdrawals; shipment of goods notification; stock price notifications, and the like. This list is not intended to be exhaustive, but merely exemplary.

The following embodiments of the present invention disclose non-limiting specific, exemplary configurations of the present invention which incorporate some or all of the various aspects of the invention described above.

Figure 10:
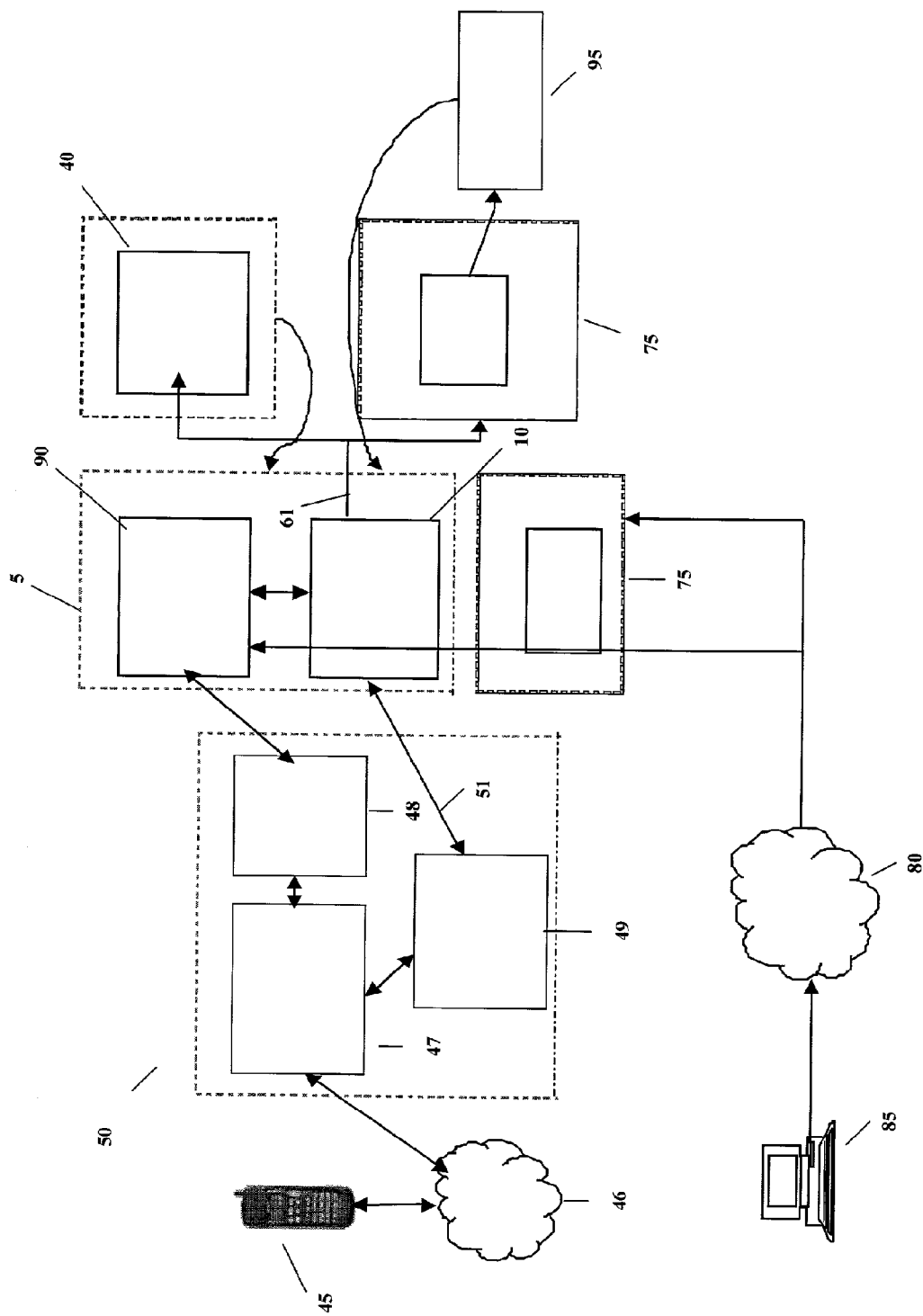
FIG. 10 illustrates a fifth system for conducting mobile commerce according to an embodiment of the present invention.

Referring to FIG. 10, a specific embodiment of the present invention provides an m-commerce solution by allowing a customer to purchase a venue ticket such as a concert or sporting event using a WAP enabled phone. For purposes of this particular embodiment, the merchant site is the Ticket Pro WML merchant site while an existing payment authorization system, e.g., JuicePay, performs the payment authorization.

Further to this embodiment, the WAP enabled phone 45, communicates directly with a telephone company, i.e., the wireless carrier who offers the service, which we refer to herein as a phone gateway 50. In this embodiment, the phone gateway 50 is comprised of a Short Message Service Controller (SMSC) 47, a WAP gateway 48, and a specialty server (i.e., BMG server) 49. Data information is carried over the airwaves via, for example, a GSM (Global System for Mobile Communications) network 46, which uses narrowband time division multiple access (TDMA), allowing eight simultaneous calls on the same radio frequency. In a first information configuration of this particular embodiment, data information is collected from the WAP phone 45 by the phone gateway 50 which is connected to the mobile system 10. The data information is communicated between the phone gateway and the mobile system via at least one of a group of first line networks 51 including, leased lines, dial-up, and Internet which support TCP/IP (Transmission Control Protocol/Internet Protocol), HTTP, WML, etc.

The mobile system 10 communicates with both merchant sites 40 and payment gateways 75 through at least one of a group of second line networks 61 including, but not limited to, dial-up and Internet which support TCP/IP, HTTPS, HTML and XML. By way of example, the merchant, Ticket Pro, maintains an inventory of concerts and sporting events, as well as, seating arrangements, costs, etc. The mobile system 10 is in electronic communication with the Ticket Pro website either directly, or through a merchant webpage provider such as eMall 40. In this particular embodiment, the messages provided by the eMall are formatted so as to be recognized and read by the phone authorization system and consequently, the WAP phone 45, without the need for any type of protocol conversion by the mobile system 10. As discussed further herein, in alternative embodiments of the present invention, there is a need for protocol conversion by the mobile system in order to facilitate communication between the merchant site and the mobile device.

Further to the embodiment illustrated in FIG. 10, the payment authorization system 75, E-pay (also known as "Juicepay"), is in electronic communication with both the mobile system 10 and the merchant site 40. The payment authorization system 75 determines what types of payment vehicles may be used by a customer to complete m-commerce transactions. The types of payment vehicles (e.g., debit cards, credit cards, financial accounts) available to customers is dependent on the ability of the payment authorization system to authorize transactions from those payment vehicles. The mobile system 10 communicates the payment vehicle information to the payment authorization system 75 for authorization, and returns a confirmation notice (i.e. whether the transaction was approved or denied) to the customer via the customer's mobile device 45.

Another aspect of the embodiment illustrated in FIG. 10, is the ability to interface simultaneously with a notification system 90, such as that described above with reference to U.S. patent application Ser. No. 09/832,863. Having the ability to simultaneously make m-commerce purchases and receive financial event notifications, allows a customer to have immediate, pre-requested information regarding accounts either as a result of, in conjunction with, or in addition to the m-commerce transaction. As a specific example, a customer using the system of FIG. 10, who has set up a virtual credit card (i.e., a payment vehicle linked to a bank account) that maintains a minimum balance of funds, is alerted by the notification system when an m-commerce purchase facilitated through the mobile system resulted in additional money been added to the virtual credit card in order to maintain the minimum balance. The messages received by the customer from the notification system are routed through the BMG server 48 and the SMSC 47 to the customer's mobile device. SMSC utilizes short message service (SMS) to transmit short text messages to and from a mobile device, fax machine and/or IP address. These particular SMS messages are no longer than approximately 160 alpha-numeric characters and contain no images or graphics. In alternative embodiments, other messaging services and protocols are supported in conjunction with the notification system such as application program interfaces and e-mail. In this embodiment, the mobile system 10 and the notification system 90 are part of the same enabling platform 5. This enabling platform 5 is managed by the same host (e.g., financial institution).

According to this particular embodiment of the invention, customers register with an account set-up and maintenance portion of the payment authorization system 76 in order to access the m-commerce configuration. Similarly, customers register directly with the notification system 90 in order to participate in the alert portion of the enabling platform 5. Registration is performed online, e.g., over the Internet 80 via a personal computer 85 or other acceptable device. During this registration process, the customer repository information, described above, is obtained and stored in a relational database of the mobile system 10.

In yet a further aspect of the embodiment illustrated in FIG. 10, the enabling platform 5 also includes a settlement service 95 for facilitating settlement with the payment authorization system 75. The settlement service 95 manages the interface between the payment authorization system and the enabling platform 5. Referred to as "embedded settlement," the settlement service 95 is integrated directly with the software that powers the marketplace to provide seamless payment and settlement capabilities. The settlement service 95 operates in conjunction with the enabling platform 5 and the payment authorization system 75 in order to settle the transaction. Through, for example, a batch feed process, push account and bill notification information is directed through the settlement service 95 in order to complete the entire transaction online, thereby reducing transaction costs and labor requirements.

The settlement system employs, for example, Secure Socket Layer (SSL) technology with standard Public Key Infrastructure (PKI) and digital signatures for each message exchange, providing a highly secure transaction processing environment. A user registers with the settlement service 95 prior to conducting m-commerce transactions. Registration may be provided through the payment authorization system 75. As discussed further below, the payment authorization system 75 and the settlement service 95 may be provided by the same host (e.g., Citibank) or as in this embodiment, these services may be offered by different hosts, but are linked for the purposes of the m-commerce transactions described herein. Depending on the payment authorization system configuration 75, the messages communicated between the payment authorization system 75 and the settlement system 95 are formatted differently. For example, in this embodiment and the embodiment described below with reference to FIG. 12, the messages are formatted as an HTTPS post. Alternatively, the messages in the embodiment illustrated in FIG. 11 are formatted using, for example, the IBM MQ Series.

Figure 11:
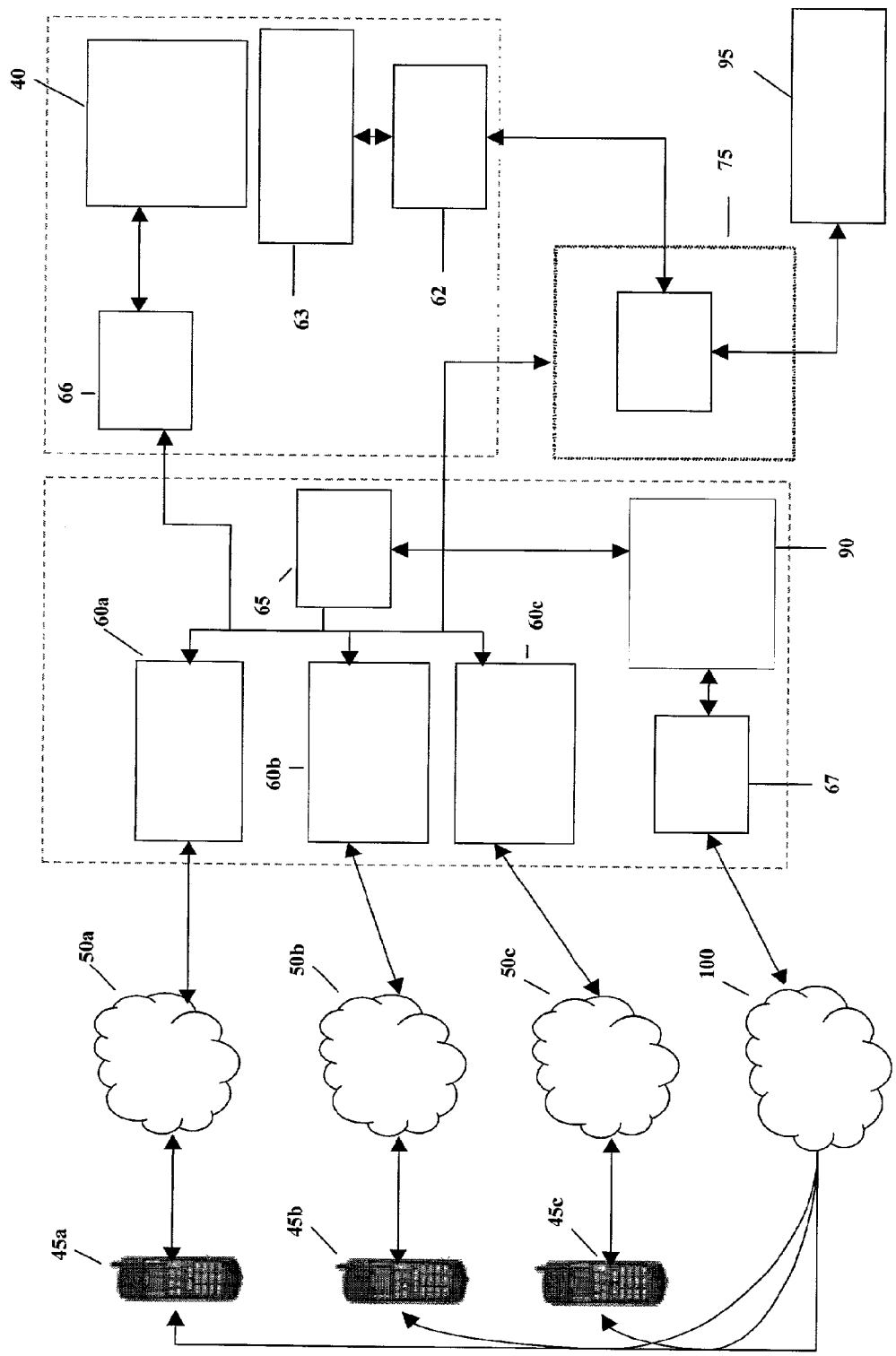
FIG. 11 illustrates a sixth system for conducting mobile commerce according to an embodiment of the present invention.

Referring to FIG. 11, an alternative embodiment of the present invention provides an m-commerce solution that allows customers to purchase various household items using at least one of multiple mobile device languages. In this particular embodiment, the mobile devices supported are WAP and CHTML enabled phones 45a-45c. Further to this embodiment, the merchant site 40 is the Fujitsu eMall (also know as the "Daiei eMall") site and the payment authorization system 75 for payment authorizations is Enhanced Card System (ECS).

In this particular embodiment, at least three different phone companies, each of which uses a different language for its customers, are utilized. Further, while the entire implementation, including information from all three phone companies, could be accomplished using one mobile system server 60 (see FIG. 3a), three separate servers 60a-60c are used for added security. Data from the mobile devices 45a-45c is captured by the respective phone gateway 50a-50c and then routed to the appropriate mobile system server 60a-60c. The phone gateways 50a-50c may be selected from any one of many companies offering mobile device services. For example, in Japan, companies include DDI, JPhone, Imode, and DoCoMo. As described above, the mobile system servers 60a-60c translate the data coming from the mobile devices 45a-45c into a language that is understandable by the merchant site 40 and then retrieve the customer requested information from the merchant site 40. As stated above, in this particular embodiment, the merchant site is actually a merchant webpage provider, also known as an eMall. Similar to the traditional shopping mall, an eMall is a grouping of many online vendors on one site. The eMall 40 may require supporting hardware, such as server 66. The servers 60a-60c perform the necessary protocol conversion on the information from the merchant site 40 and send that information to the customer's mobile device. Since a separate server 60a-60c is used for each phone gateway 50a-50c, the appropriate server anticipates which wireless protocol language to expect from the phone gateway and the appropriate protocol conversion required.

As previously discussed, the embodiment described with reference to FIG. 11 is configurable using only a single server for all phone gateways. In this alternative embodiment, each phone gateway has a separate IP ("Internet Protocol") address on the single server. Thus, when incoming data is sent to the single server from the phone gateway each separate protocol has a different starting point on the single server so that the single server knows the appropriate conversion protocol required for each phone gateway.

Further, with respect to FIG. 11, when the customer is prepared to make a purchase from the merchant site 40, the payment information is sent to the payment gateway 75 for authorization. Confirmation from the payment authorization system 75 is then sent back to the customer's mobile device 45. Confirmation is also sent to the merchant site 40 for order fulfillment. FIG. 11 illustrates additional hardware and services, such as, an NT server 62 and a credit card processing service (e.g., Daiei OMC) 63, which are useful in facilitating payment authorization. As in the embodiment described with respect to FIG. 10, this embodiment also includes the optional settlement service 95 described above. Repository information in this configuration is held on an SQL server 65 (i.e. relational database server) that is connected to both the servers 60a-60c and, optionally, the notification system 90. In this embodiment, the notification system 90 communicates with the SQL server 65 in order to provide and update customer repository information. The notification system of the current embodiment utilizes a SMTP (Simple Mail Transfer Protocol) server 67, separate from servers 60a-60c and 65 in order to facilitate wireless notifications to the customer's mobile device 45a-45c via network 100. One skilled on the art recognizes the various server configurations which could be used to facilitate the data transfers and manipulations described herein. This specification incorporates by reference the knowledge of one skilled in the art.

In the embodiments described above, because all the wireless protocols being used are not considered secure, leased lines may be used, where available, so that data coming from each of the phone gateways is encrypted. In these configurations, the servers 60a-60c decrypt all incoming data before performing the appropriate protocol conversion and encrypt all outgoing data after performing the appropriate protocol conversion. Any encryption technique known to one of skill in the art may be used, including but not limited to, secure socket layer (SSL) or public/private key (PKI) encryption.

Figure 12:
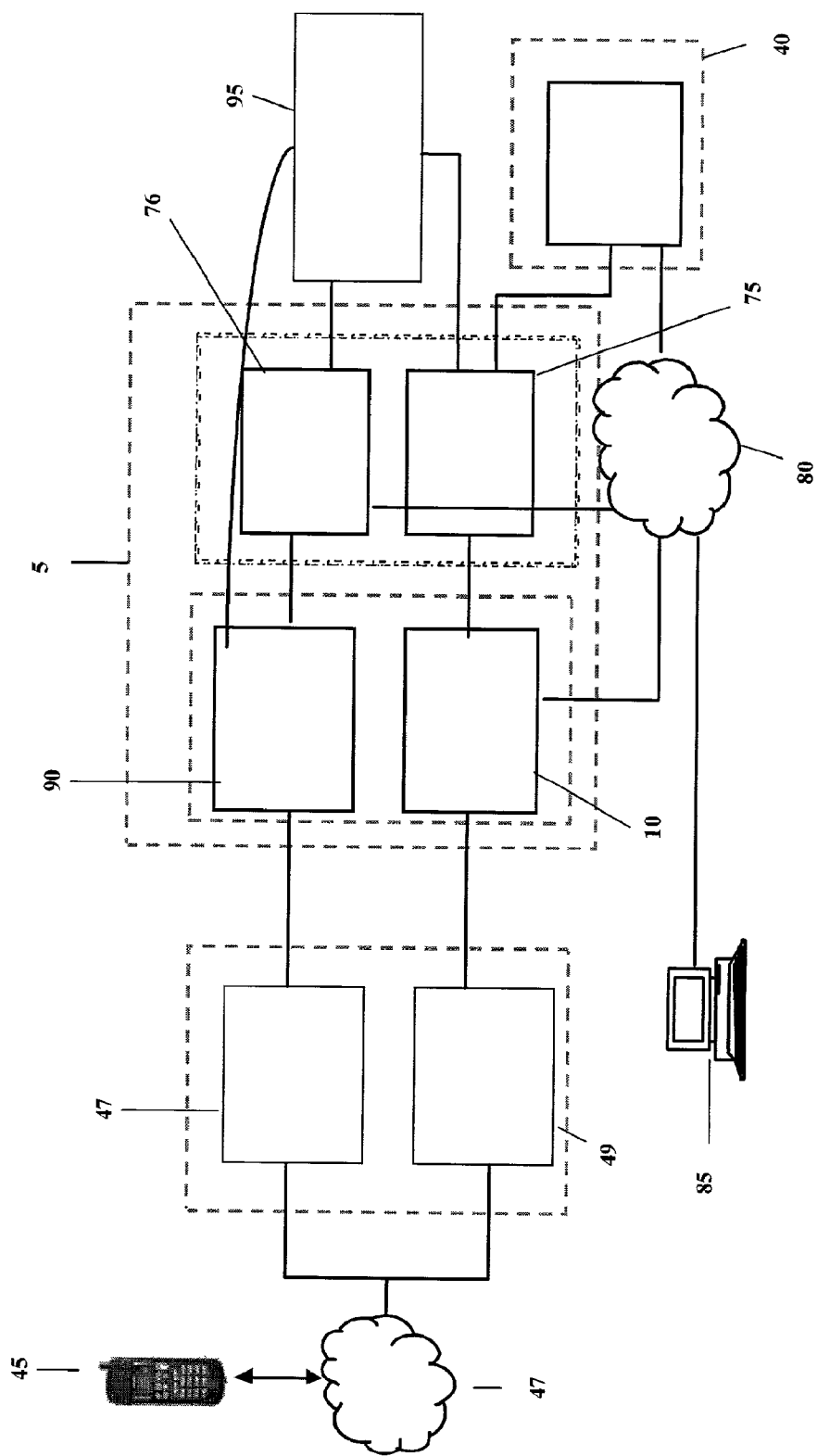
FIG. 12 illustrates a seventh system for conducting mobile commerce according to an embodiment of the present invention.

Referring to FIG. 12, in still another embodiment of the present invention, an m-commerce solution provides customers with rapid transactional capabilities (i.e., bill payment, transfer, account information, etc.) through the customer's mobile device 45 via the host of the mobile system. In the previous embodiments, the payment authorization systems and the host of the mobile system are separate entities. Referring to FIG. 12, the payment authorization system 75 is part of the mobile system 10 and consequently, as with the notification system 90, these are part of an enabling platform 5 which is managed by a single host (e.g., Citibank). The interoperation of the components of FIG. 12 is similar to that described with reference to FIG. 10. By using the protocol conversion aspect of the present invention, customers can have direct access to transactional information already available on the Internet.

The embodiments described herein are exemplary of the inventive concept set forth, said examples including the best mode of practicing the inventive concept. This disclosure is in no way intended to be limiting. One skilled in the art recognizes the various other embodiments that fall within the scope of the invention and though not explicitly recited herein, are in fact covered by this disclosure.

The invention claimed is:

1. A machine for conducting mobile commerce comprising:
    a mobile system platform having a processor coupled to memory, wherein the mobile system platform processor is programmed for:
    communicating, using at least one communication agent managed by a state manager, to a merchant website server processor a purchase request, the purchase request having been received via a mobile communications network from a mobile communication device in a wireless language and translated, using at least one translation agent managed by the state manager, to a web-based language that is recognizable by the merchant website server processor;
    receiving a purchase request response, including a payment authorization request, from the merchant website server processor in the web-based language;
    forwarding the purchase request response in the web-based language to a payment authorization system processor for a payment authorization response;
    receiving the purchase request response, including the payment authorization response, in the web-based language from the payment authorization system processor; and
    transmitting, using the at least one communication agent managed by the state manager, to the mobile communication device via the mobile communications network the purchase request response, the transmitted purchase request response having been parsed, using at least one parsing agent managed by the state manager, in the web-based language into translatable pieces and translated, using the at least one translation agent managed by the state manager, into the wireless language.

2. The machine according to claim 1, wherein the mobile system platform processor is further programmed for receiving via the mobile communications network from the mobile communication device the purchase request in the wireless language and identifying, using the state manager, a type of the mobile communication device.

3. The machine according to claim 2, wherein the mobile system platform processor is further programmed for engaging, by the state manager, the at least one translation agent based at least in part on the identified type of the mobile communication device.

4. The machine according to claim 3, wherein the mobile system platform processor is further programmed for translating, using the at least one translation agent managed by the state manager, the received purchase request from the wireless language to the web-based language that is recognizable by the merchant website server processor.

5. The machine according to claim 4, wherein the mobile system platform processor is further programmed for parsing, using the at least one parsing agent managed by the state manager, the received purchase request response from the web-based language into the translatable pieces.

6. The machine according to claim 5, wherein the mobile system platform processor is further programmed for translating, using the at least one translation agent managed by the state manager, the translatable pieces into the wireless language.

7. The machine according to claim 1, wherein the mobile system platform processor is further programmed for:
    communicating, using the at least one communication agent managed by the state manager, to the merchant website server processor a request for merchant website information, the merchant website information request having been received via the mobile communications network from the mobile communication device in the wireless language and translated, using the at least one translation agent managed by the state manager, to the web-based language that is recognizable by the merchant website server processor;
    receiving the requested merchant website information from the merchant website server processor in the web-based language; and
    transmitting, using the at least one communication agent managed by the state manager, to the mobile communication device via the mobile communications network a reply message containing the requested merchant website information, the transmitted reply message having been parsed, using the at least one parsing agent managed by the state manager, in the web-based language into translatable pieces and translated, using the at least one translation agent managed by the state manager, into the wireless language.

8. The machine according to claim 1, wherein the wireless language is selected from a group consisting of wireless markup language (WML); handheld device mark-up language (HDML); Imode; and compact hypertext markup language (CHTML).

9. The machine according to claim 1, wherein the web-based language is selected from a group consisting of extensible markup language (XML); compact hypertext markup language (CHTML); extensible hypertext markup language (XHTML); and hypertext markup language (HTML).

10. A machine for conducting mobile commerce comprising:
    a mobile system platform having a processor coupled to memory, wherein the mobile system platform processor is programmed for:
    purchase request in a wireless language;
    translating, using at least one translation agent managed by a state manager, the purchase request from the wireless language to a web-based language that is recognizable by a merchant website server processor;
    communicating, using at least one communication agent managed by the state manager, the translated purchase request in the web-based language to the merchant website server processor;
    receiving a purchase request response, including a payment authorization request, from the merchant website server processor in the web-based language;
    forwarding the purchase request response in the web-based language to a payment authorization system processor for a payment authorization response;

receiving the purchase request response, including the payment authorization response, in the web-based language from the payment authorization system processor;

parsing, using at least one parsing agent managed by the state manager, the purchase request response in the web-based language into translatable pieces and translating, using the at least one translation agent managed by the state manager, the translatable pieces of the purchase request response into the wireless language; and transmitting, using the at least one translation agent managed by the state manager, via the mobile communications network the purchase request response in the wireless language to the mobile communication device.

11. A non-transitory computer-readable storage medium with an executable program for conducting mobile commerce stored thereon, wherein the program instructs a processor of a mobile system platform to perform the following:

communicating, using at least one communication agent managed by a state manager, to a merchant website server processor a purchase request, the purchase request having been received via a mobile communications network from a mobile communication device in a wireless language and translated, using at least one translation agent managed by the state manager, to a web-based language that is recognizable by the merchant website server processor;

receiving a purchase request response, including a payment authorization request, from the merchant website server processor in the web-based language;

forwarding the purchase request response in the web-based language to a payment authorization system processor for a payment authorization response;

receiving the purchase request response, including the payment authorization response, in the web-based language from the payment authorization system processor; and transmitting, using the at least one communication agent managed by the state manager, to the mobile communication device via the mobile communications network the purchase request response, the transmitted purchase request response having been parsed, using at least one parsing agent managed by the state manager, in the web-based language into translatable pieces and translated, using the at least one translation agent managed by the state manager, into the wireless language.

12. A non-transitory computer-readable storage medium with an executable program for conducting mobile commerce stored thereon, wherein the program instructs a processor of a mobile system platform to perform the following:

receiving via a mobile communications network from a mobile communication device a purchase request in a wireless language;

translating, using at least one translation agent managed by a state manager, the purchase request from the wireless language to a web-based language that is recognizable by a merchant website server processor;

communicating, using at least one communication agent managed by the state manager, the translated purchase request in the web-based language to the merchant website server processor;

receiving a purchase request response, including a payment authorization request, from the merchant website server processor in the web-based language;

forwarding the purchase request response, including the payment authorization request, in the web-based language to a payment authorization system processor for a payment authorization response;

receiving the purchase request response, including the payment authorization response, in the web-based language from the payment authorization system processor;

parsing, using at least one parsing agent managed by the state manager, the purchase request response in the web-based language into translatable pieces and translating, using the at least one translation agent managed by the state manager, the translatable pieces of the purchase request response into the wireless language; and transmitting, using the at least one translation agent managed by the state manager, via the mobile communications network the purchase request response in the wireless language to the mobile communication device.

* * * * *